US005912999A

United States Patent [19]
Brennan, III et al.

[11] Patent Number: 5,912,999
[45] Date of Patent: Jun. 15, 1999

[54] METHOD FOR FABRICATION OF IN-LINE OPTICAL WAVEGUIDE INDEX GRATING OF ANY LENGTH

[75] Inventors: James F. Brennan, III; Dwayne LaBrake; Gerard A. Beauchesne, all of Austin; Ronald P. Pepin, Georgetown, all of Tex.

[73] Assignee: Minnesota Mining and Manufacturing Company, St. Paul, Minn.

[21] Appl. No.: 08/942,590

[22] Filed: Oct. 2, 1997

[51] Int. Cl.⁶ .................................................. G02B 6/34
[52] U.S. Cl. ............................ 385/37; 385/123; 359/569
[58] Field of Search ............................... 385/10, 37, 123; 372/6, 96; 359/566, 569, 570, 573, 577, 900, 130, 161

[56] References Cited

U.S. PATENT DOCUMENTS

| | | | |
|---|---|---|---|
| 5,066,133 | 11/1991 | Brienza ..................................... | 359/570 |
| 5,619,603 | 4/1997 | Epworth et al. ........................... | 385/37 |
| 5,636,304 | 6/1997 | Mizrahi et al. ............................ | 385/37 |
| 5,708,738 | 1/1998 | Perez et al. ................................ | 385/37 |

FOREIGN PATENT DOCUMENTS

| | | | |
|---|---|---|---|
| WO 98/081220 | 5/1998 | WIPO ............................. | G02B 6/16 |

OTHER PUBLICATIONS

Raoul Stubbe, Bengt Sahlgren; Simon Sandgren and Adel Asseh of the Royal Instiitue of Technology, Stockholm, Sweden; "*Novel Technique for Writing Long Superstructured Fiber Bragg Gratings* ", XP 002046186, PD1–1 to PD1–3 (285); Sep. 1995

"Continous, Arbitrary Profile Fibre Bragg Grating Fabrication Technique", M. J. Cole et al., presented to Optical Society of America, Oct. 23,1997.

"1m long continously–written bfibre Bragg gratings for combined second–and third–order dispersion compensation", M. Durkin et al., *Electronics Letters*, 23 Oct. 1997, vol. 33, No. 22, pp. 1891–1893.

"Novel technique for writing long superstructured fiber Bragg gratings", R. Stubbe et al., Photosensitivity and Quadratic Nonlinearity in Glass Waveguides: Fundamental and Applications, 1995 Technical Digest Series, vol. 22, pp. 285–287

"Moving fibre/phase mask scanning beam technique for enhanced flexibility in producing fibre gratings with uniform phase mask", M. J. Cole et al., *Electronics Letters*, 17 Aug. 1995, vol. 31, No. 17 pp. 1488–1490.

"A Writing Technique for Long Fiber Bragg Gratings with Complex Reflectivity Profiles", A Asseh et al., *IEEE , Journal of Lightwave Technology*, vol. 15, No. 8, Aug. '97, pp. 1419–1423.

"Fiber gratings for dispersion compensation", R. I. Laming et al., OFC '97 *Technical Digest*, Thursday Morning, pp. 234–235.

(List continued on next page.)

*Primary Examiner*—Hemang Sanghavi
*Attorney, Agent, or Firm*—Nestor F. Ho

[57] ABSTRACT

A method and an apparatus for writing apodized Bragg gratings into an optical fiber. The method includes the steps of providing a photosensitive optical fiber and a writing beam. A periodic intensity distribution of period $\Lambda$ is created from the writing beam and the optical fiber is translated relative to the intensity distribution at a velocity $v(t)$. The intensity of the writing beam is modulated as a function of time at a frequency $f(t)$, where $$\frac{v(t)}{f(t)} \approx \Lambda.$$

The intensity of the writing beam is varied further to control the envelope of the refractive index profile to write apodized gratings.

44 Claims, 5 Drawing Sheets

OTHER PUBLICATIONS

"Complex grating structures with uniform phase masks based on the moving fiberscanning beam technique", W. H. Loh et al., *Optics Letters*, 15 Oct. '95, vol. 20, No. 20, pp. 2051–2053.

"Broadband dispersion–compensating chirped fibre Bragg gratings in a 10Gbit/s NRZ 110km non–dispersion–shifted fibre link operating at 1.55$\mu$m", M. J. Cole et al., *Electronics Letters*, 2 Jan. '97, vol. 33, No. 1, pp. 70–71.

"Chirped in–fiber Bragg gratings for compensation of optical–fiber dispersion", K. O. Hill et al., *Optics Letters*, 1 Sept. '94, vol. 19, No. 17, pp. 1313–1316.

"Fiber Bragg Grating Fabrication for Dispersion Slope Compensation", J.A.R. Williams, et al., *IEEE Photonics Technology Letters*, Sept. 96, vol. 8, No. 9, pp. 1187–1189.

"1.3, long super–step–chirped fibre Bragg grating with a continuous delay of 13.5ns and bandwidth 10nm for broadband dispersion compensation", R. Kashyap et al., *Electronics Letters*, 12 Sept. 96, vol. 32, No. 19, pp. 1807–1809.

"Experimental reduction of chromatic dispersion effects in lightwave microwave/millemetre–wave transmissions using tapered linearly chirped fibre gratings", J. Marti et al., *Electronics Letters*, 19 Jun 97, vol. 33, No. 13, pp. 1170–1171.

"Fabrication and characterisation of long, narrowband fibre gratings by phase mask scanning", H. N. Rourke et al., *Electronics Letters*, 4 Aug. 94, vol. 30, No. 16, pp. 1341–1342.

"Novel writing technique of long and highly reflective in–fibre gratings", J. Martin et al., *Electronic Letters*, 12 May 94, vol.30, No. 10, pp. 811–812.

METHOD FOR FABRICATION OF IN-LINE OPTICAL WAVEGUIDE INDEX GRATING OF ANY LENGTH

FIELD OF THE INVENTION

The present invention relates to a method for making in-line optical waveguide refractive index gratings of any desired length. More specifically, the present is directed to a method for making a pure-apodized, chirped fiber Bragg grating (FBG) of any length by translating a fiber with respect to an interferogram of actinic radiation with an intensity that is amplitude modulated as a function of time.

BACKGROUND OF THE INVENTION

In-line optical waveguide refractive index gratings are periodic, aperiodic or pseudo-periodic variations in the refractive index of a waveguide. Gratings may be formed, for example, by physically impressing a modulation on the waveguide, by causing a variation of the refractive index along the waveguide using the photosensitivity phenomenon, or by other methods known in the art. In particular, gratings written into the core of an optical fiber are critical components for many applications in fiber-optic communication and sensor systems.

Dopants, such as germanium, are added to an area of the waveguide material to make it photosensitive, causing the refractive index of that region to be susceptible to increase upon exposure to actinic radiation. The currently preferred method of "writing" an in-line grating comprises exposing a portion of the waveguide to the interference between two beams of actinic (typically UV) radiation. The two beams are incident on the guiding structure of the waveguide in a transverse direction to create an interferogram, that is, a pattern of optical interference. The angle between the two beams (and the wavelength of the radiation) defines the fringe spacing of the interferogram. Typically, the two beams of actinic radiation are the legs of an interferometer or are produced by launching a single beam through a phase mask. The phase mask method is considered generally more suitable for large scale manufacture of in-line gratings, because it is highly repeatable, less susceptible to mechanical vibrations of the optical setup, and can be made with writing beams of much shorter coherence length.

Advantages of optical fiber in-line gratings over competing technologies include all-fiber geometry, low insertion loss, high return loss or extinction, and potentially low cost. But one of the most distinguishing features of fiber gratings is the flexibility the gratings offer for achieving desired spectral characteristics. Numerous physical parameters of the gratings can be varied, including induced index change, length, apodization, period chirp, grating pitch tilt, and whether the grating supports coupling into co-propagating (long-period or transmission gratings) or counter-propagating coupling (Bragg gratings) at a desired wavelength. By varying these parameters, gratings can be tailored for specific applications.

The versatility of an in-line grating is largely dependent on two factors, the overall length of the grating structure and the reflectivity (or transmission) profile of the grating structure itself Intricate reflectivity profiles can be achieved by carefully controlling the refractive index perturbation along the waveguide length, x. The index perturbation $\partial n(x)$ may be characterized as a phase and amplitude-modulated periodic function, $$\partial n(x) = \partial n_0(x) \cdot \left\{ A(x) + m(x) \cdot \cos\left[\frac{2\pi}{\Lambda} \cdot x + \phi(x)\right] \right\}, \quad (1)$$

where $\partial n_0(x)$ is the "dc" index change spatially averaged over a grating period, $A(z)$ is an offset (typically $A=1$), $m(x)$ is the fringe visibility of the index change, $\Lambda$ is the nominal period and $\phi(x)$ describes grating chirp. To automate the fabrication process, it is desirable to write this arbitrary refractive index profile into a waveguide in a single process step, i.e., with a single pass of the laser beam over the waveguide and without physically changing the writing apparatus. For fill flexibility in grating manufacture, one needs to control independently each of the parameters describing $\partial n(x)$.

In particular, apodization of a grating spectrum may be achieved by controlling say $\partial n_0(x)$ and $m(x)$ along the grating length. The main peak in the reflection spectrum of a finite length in-line grating with uniform modulation of the index of refraction is accompanied by a series of sidelobes at adjacent wavelengths. Lowering the reflectivity of the sidelobes, or "apodizing" the reflection spectrum of the grating, is desirable in devices where high rejection of nonresonant light is required. Apodization also improves the dispersion compensation characteristics of chirped gratings. In most of these applications, one desires apodization created by keeping $\partial n_0(x)$ and $A(x)$ constant across the grating length while $m(x)$ is varied, which is believed not to have been achieved (with full flexibility) in a single-step process by controlling only the laser beam.

Variation of the index modulation by changing the ultraviolet exposure along the length of the grating causes both the magnitude of the refractive index modulation and the average photoinduced refractive index to vary. The average index variation leads to undesirable effective chirps of the resonant wavelength of the grating and widens the grating spectral response. To alleviate these symptoms, it is desirable to "pure apodize" the grating, that is, to generate both the non-uniform modulated ultraviolet fringe pattern and a compensating exposure which automatically ensures that the average photoinduced refractive index is constant along the length of the fiber. Some researchers have created the desired apodization profile by dithering the waveguide in the interferogram to decrease refractive index fringe visibility at specified locations along the waveguide length, but these techniques require complex mechanical fixtures for the phase mask and waveguide that can be vibrated yet precisely positioned.

In addition to the specific index perturbation written into the waveguide, grating length is also important in certain applications in optical fiber communication and distributed sensor systems. For instance, long-length chirped fiber Bragg gratings have been suggested as attractive devices for the manufacture of dispersion compensators. High-speed, long distance data transmissions, especially transmissions over existing non-dispersion shifted fiber networks, are limited by chromatic dispersion in the optical fiber. Since the transmission bandwidth usually is predetermined by the needs of the system, to be usable as dispersion compensators in practice, chirped Bragg gratings need to exhibit dispersion compensation over a bandwidth large enough to cover typical semiconductor laser wavelength tolerances. It has been reported that a grating of the order of 1 meter in length with a constant dispersion profile and a broad bandwidth would be required to achieve a time delay of ~1700 ps/nm sufficient to compensate for 100 km of non-dispersion shifted fiber over 5 nm at a wavelength of 1550 nm.

The need exists for a method for producing long length Bragg gratings having complex grating structures. One method has been described where a UV-beam is scanned over a long phase mask having a fixed position relative to the fiber. Complex structures are added by varying the exposure time or by postprocessing the grating. Another method discusses the use of fibers held in a fixed position relative to specially designed long phase masks having the complex structure already imprinted in the mask. However, both of these techniques are limited by the length of available phase masks, usually about ~10 cm.

A method for writing gratings where the waveguide moves in relation to the mask has been suggested. However, this technique is limited, since the fringe visibility of the index modulation in the waveguide will decrease significantly if the waveguide moves relative to the phase mask too much, so gratings much larger than a phase mask cannot be made. Recent developments have attempted to produce long complex gratings by scanning a UV-beam over a phase mask and writing sub-gratings (a number of grating elements) at every irradiation step on the fiber while moving the fiber using a very precise piezoelectric transducer. To increase the size of the grating structure, a number of subgratings may then be concatenated to one another. The fiber is translated with high-precision staging relative to an interferogram of UV-light. The position of the stage is tracked interferometrically and the laser is triggered when the fiber reaches the desired position for the next irradiation. The phasing between these subgratings may be controlled to create some complex structures, such as chirps. Apodization may be achieved by dithering about an interferogram/fiber relative position.

The concatenation process suffers from needing extremely accurate positioning staging, which is currently available only by using an interferometer as an encoder. Without interferometric control, the concatenation methods suffers from "stitching" errors, i.e., errors in the matching of the grating elements. Presently only linear motion staging can be interferometrically controlled; rotary stages must use mechanically-ruled encoders. Therefore, the length of a fiber grating made with a concatenation process is limited by the linear travel available on precision stages, the implementation of which currently become prohibitively expensive if much longer than one meter. Since the protective housing around a fiber must be removed for grating fabrication, a long length of bare fiber containing the grating is removed from the precision staging and coiled for packaging, which increases fabrication complexity (increased handling), complicates manufacture automation, and is likely to reduce the mechanical strength of the fiber.

The need remains for an effective writing technique for very long length in-line optical waveguide gratings having complicated reflectivity profiles.

SUMMARY OF THE INVENTION

The present invention discloses a novel method for manufacturing a grating of any length, with independent control of each parameter defining the index perturbation. In a method of manufacturing in accordance with the present invention, a photosensitive waveguide, such as an optical fiber, is provided. A writing beam of actinic radiation, such as a UV laser beam, is positioned to write on the fiber. A periodic intensity distribution is obtained, for example by using an interference pattern generator such as a phase mask positioned between the writing beam and the waveguide to create an interferogram of period $\Lambda$.

The waveguide then is translated through the periodic intensity distribution relative to the writing beam at a precisely-controlled relative velocity v(t). Alternatively, the fiber may be coupled to a spool which rotates to draw the fiber at v(t) through the periodic intensity distribution. Finally, a modulator varies the amplitude of the beam intensity as a function of time at a frequency $f(t)$ such that $$\frac{v(t)}{f(t)} \approx \Lambda.$$

The writing beam at the fiber has a peak intensity $I_0$ and a width D. The fluence $\Phi(x)$ delivered to the fiber is determined by the equation $$\Phi(x) \approx \frac{I_0}{4} \cdot \frac{D}{v(x)} \cdot \left\{1 - \frac{1}{2} \cdot \cos\left[\frac{\omega(x)}{v(x)} \cdot x\right]\right\} \quad (2)$$

where $\omega = 2\pi \cdot f$. Either v or $\omega$ may be kept constant during the writing process. Either parameter may be detuned to chirp the refractive index perturbation along the grating length $x = v \cdot t$.

The method also may include the step of controlling further the intensity of the writing beam to vary the visibility of the index variation, m, and peak intensity illuminating the fiber, $I_0$. The offset of the oscillating index perturbation, A, also may be controlled. The flux delivered to the fiber is then determined by the equation $$\Phi(x) \approx \frac{I_0(x)}{4} \cdot \frac{D}{v(x)} \cdot \left\{A(x) - \frac{m(x)}{2} \cdot \cos\left[\frac{\omega(x)}{v(x)} \cdot x\right]\right\} \quad (3)$$

Modulation of the index variation visibility, m, allows the fabrication of pure-apodized gratings. By varying these additional parameters, i.e., the amplitude and offset of the refractive index oscillations, the refractive index envelope along the fiber length can be precisely controlled.

DETAILED DESCRIPTION OF THE INVENTION

Figure 1:
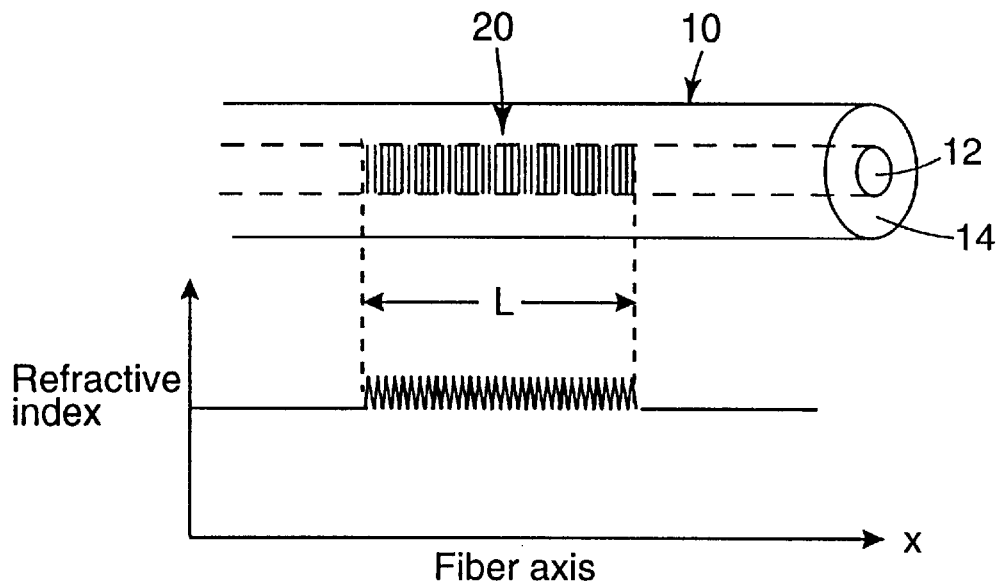
FIG. 1 is a simplified schematic representation of a fiber Bragg grating including a possible refractive index profile.

An optical fiber 10 having a grating 20 of length L is illustrated in FIG. 1. The fiber 10 usually comprises silica, although other embodiments known in the art may comprise plastic compounds. The optical fiber 10 includes a core 12 and one or more claddings 14. The grating 20 is a series of periodic, aperiodic or pseudo-periodic variations on the core 12 and/or one or more of the claddings 14 of the fiber. As illustrated in the matched plot shown in FIG. 1, the grating 20 consists of variations in the refractive index of the fiber 10.

Figure 2:
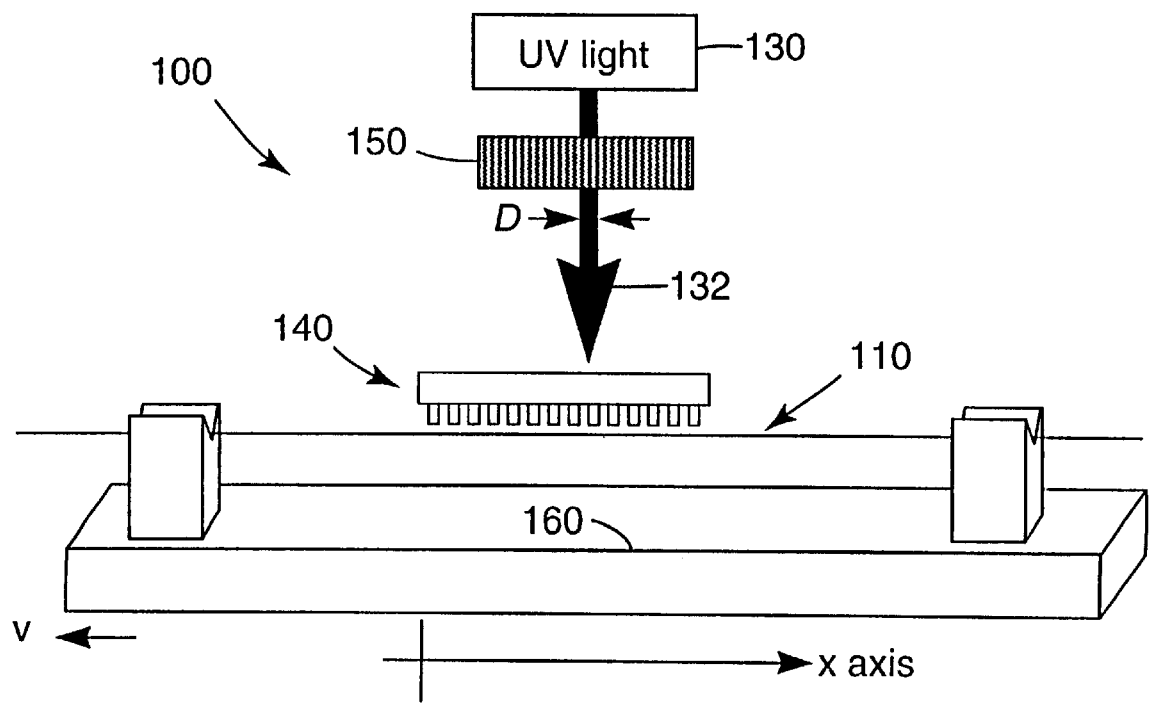
FIG. 2 is a simplified schematic representation of an in-line optical waveguide refractive index writing assembly, writing fiber gratings in accordance with the present invention.

FIG. 2 schematically illustrates an index writing assembly 100 using the writing method of the present invention. The index writing assembly 100 includes a source of light 130 producing a beam 132, an interference pattern generator 140, a modulator 150, and a fiber holding assembly 160 used to hold a fiber 110. More than one waveguide may be placed and translated simultaneously in the index writing assembly. Germanium or other photosensitive dopants are added to the silica glass of a region of the fiber 110, making the refractive index of that region of the optical fiber susceptible to change, generally an increase, upon exposure to actinic radiation. Commercially available photosensitive fibers, such as Corning® SMF-28™ CPC6 (Corning Incorporated, Corning, N.Y.), may be used. As those skilled in the art may appreciate, the method of the present invention also may be used to modify the refractive index not only of optical fibers, but also of other waveguides, such as planar waveguides.

The light source 130 is a source of actinic radiation, such as a UV laser light or X-ray radiation. The source of light is selected to deliver a beam of sufficient intensity and having a sufficiently narrow diameter to write the desired grating. Other sources of light known in the art may be used depending on the type of fiber used and the desired grating pattern. The source of light 130 produces a beam 132 having a peak intensity of $I_0$ and a diameter D.

The interference pattern generator 140 creates an intensity distribution of period $\Lambda$ and is positioned between the fiber 110 and the source of light 130. The period of the intensity distribution generally matches the desired grating pitch. An intensity distribution is a spatially varying repeating light intensity pattern, which can be periodic or quasi-periodic, such as, for example, an interferogram. The interference pattern generator 140 is a phase mask of period 2$\Lambda$, such as a Lasirus PM-248-1.078-25.4 (Lasirus Inc., Saint-Laurent, Quebec, Canada) of period 1.078 $\mu$m which creates an interferogram of period 0.539 $\mu$m. The interferogram may be produced by other methods, such as an interferometer. Alternatively, as one skilled in the art may appreciate, the periodic (or quasi-periodic) intensity distribution of actinic radiation used to fabricate a grating, need not necessarily be obtained by constructing an interferogram. For instance, an image reduction system utilizing amplitude masks may be used to create the intensity distribution.

Figure 3:
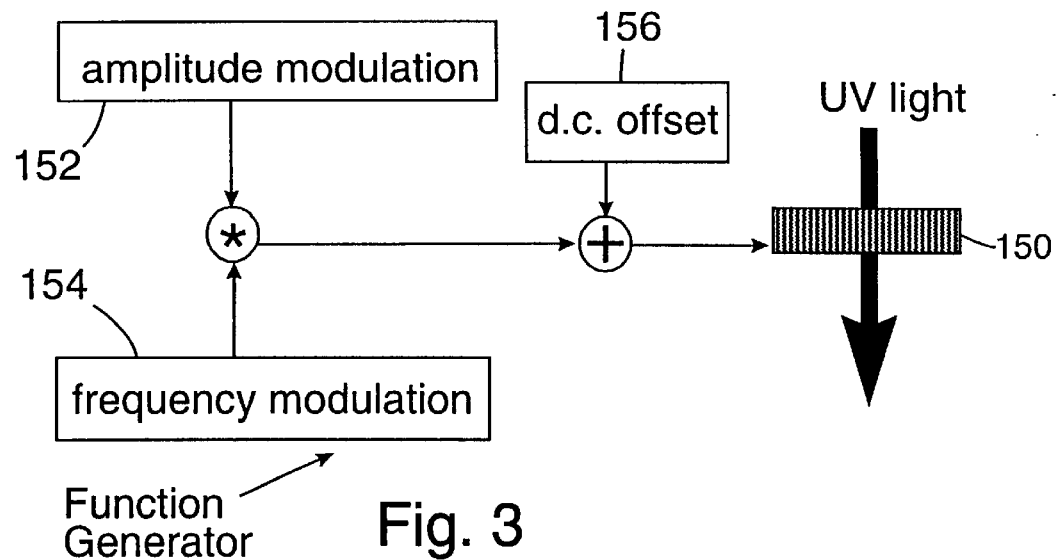
FIG. 3 is a simplified schematic representation of a refractive index envelope modulation in-line optical waveguide refractive index writing assembly, writing fiber gratings in accordance with the present invention.

FIG. 3 illustrates schematically one embodiment of the electronic signal controls of modulator 150. The electronic signal controls of modulator 150 include an amplitude modulation function 152, a frequency modulation unction 154 and a d.c. offset 156. A variety of modulators may be used, such as an opto-acoustic modulator (for example, IntraAction ASM-1251LA3 from IntraAction, Bellwood, Ill.). The modulator 150, amplitude modulates the beam 132 at a frequency $f(t)$. In addition, as illustrated in FIG. 3, the electronic signal that controls the modulator may be shaped by a unction generator, such as a Stanford Research Systems DSM345 (Stanford Research Systems, Sunnyvale, Calif.), to tailor the index perturbation profile along the fiber length to cause chirp and apodization in the resulting grating.

The fiber 110 is translated at a velocity $v(t)$ relative to the intensity distribution. More than one waveguide may be translated simultaneously through the periodic intensity distribution. A laser beam that is amplitude-modulated as a function of time and a phase mask is used to create FBGs of any desired length. In the present example, the fiber 110 is translated at a precise velocity $v(t)$ past a stationary phase mask 140 through which propagates the laser beam 132 that is amplitude-modulated at a radial frequency $\omega(\omega=2\pi f)$, where, $$\frac{f(t)}{v(t)} \approx \frac{1}{\Lambda}.$$

Depending on the writing assembly and the desired profile, both $f(t)$ and $v(t)$ may be variable unctions, or either or both could be constants. Of course, the term constant is defined within the acceptable parameters for deviations in the fiber grating pitch ($\delta\Lambda$) due to jitter or error, as explained below.

The movement of the fiber 110 in relation to the intensity distribution is controlled precisely by a translation mechanism. The fiber 110 is mounted on the fiber holding assembly 160, a very precise velocity-controlled motion stage which may be a rotary or linear stage. In an alternative embodiment, illustrated in FIG. 4, a continuous length of fiber is spooled in a spool 170 and the position of the writing beam is tracked to stay on the fiber as the spool rotates. The movement of the stage or the spool is coupled to act in synchrony with the modulator, $$\frac{v(t)}{f(t)} \approx \Lambda.$$

In yet other alternative embodiments, the translation mechanism may control the movement of the source of light 130 and of the interferogram generator 140.

The laser beam 132 need not move relative to the phase mask 140. Mathematically this can be expressed as $$\Phi(x) = \int_{x/v}^{x+D/v} I_0 \cdot \sin^2 \frac{\omega}{2} t \cdot \sin^2\left[\frac{\pi}{\Lambda} \cdot (x - v \cdot t)\right] \cdot dt \qquad (4)$$

$$= \frac{I_0}{4} \int_{x/v}^{x+D/v} (1 - \cos\omega t) \cdot \left(1 - \cos\left[\frac{2\pi}{\Lambda} \cdot (x - v \cdot t)\right]\right) \cdot dt$$

The integral can be reduced to yield $$\Phi(x) = \qquad (5)$$

$$\frac{I_0}{4} \cdot \frac{D}{v} \cdot \left\{1 - \operatorname{sinc}\left[\frac{2\pi}{\Lambda} \cdot D\right] - \operatorname{sinc}\left(\frac{\omega}{2 \cdot v} \cdot D\right) \cdot \cos\left[\frac{\omega}{v} \cdot x + \frac{\omega}{2 \cdot v} \cdot D\right] - \frac{1}{2}\operatorname{sinc}\left[D \cdot \left(\frac{2\pi}{\Lambda} \pm \frac{\omega}{v}\right)\right] \cdot \cos\left[\pm \frac{\omega}{v} \cdot x - D \cdot \left(\frac{2\pi}{\Lambda} \pm \frac{\omega}{v}\right)\right]\right\}$$

where $\operatorname{sinc}(x) = \sin(x)/x$, $I_0$ is the peak intensity illuminating the fiber, D is the diameter of the beam, $\Phi(x)$ is the fluence delivered to the fiber, m is the index variation and A(x) is the offset of the oscillating index perturbation. The third term indicates that in alternative embodiments using small writing beams, such as sub-micron diameter lasers, or if the laser beam is smaller than the desired fiber grating pitch, then a phase mask is not needed. The desired grating pitch is then defined as $\Lambda$, where $$\frac{f(t)}{v(t)} \approx \frac{1}{\Lambda}.$$

If the diameter of the beam is much larger than the period of the phase mask, then equation (5) reduces to $$\Phi(x) \approx \frac{I_0}{4} \cdot \frac{D}{v} \cdot \left\{1 - \frac{1}{2}\operatorname{sinc}\left[D \cdot \left(\frac{2\pi}{\Lambda} \pm \frac{\omega}{v}\right)\right] \cdot \cos\left[\pm\frac{\omega}{v} \cdot x - D \cdot \left(\frac{2\pi}{\Lambda} \pm \frac{\omega}{v}\right)\right]\right\} \quad (6)$$

The second term in (6) (which is actually two terms) contains a tuning parameter $$\left(\frac{2\pi}{\Lambda} \pm \frac{\omega}{v}\right),$$

whereby if $$\frac{f(t)}{v(t)} \approx \frac{1}{\Lambda}$$

(where $\omega = 2\pi f$), then $$\Phi(x) \approx \frac{I_0}{4} \cdot \frac{D}{v} \cdot \left\{1 - \frac{1}{2} \cdot \cos\left[\frac{\omega}{v} \cdot x\right]\right\} \quad (7)$$

Figure 5:
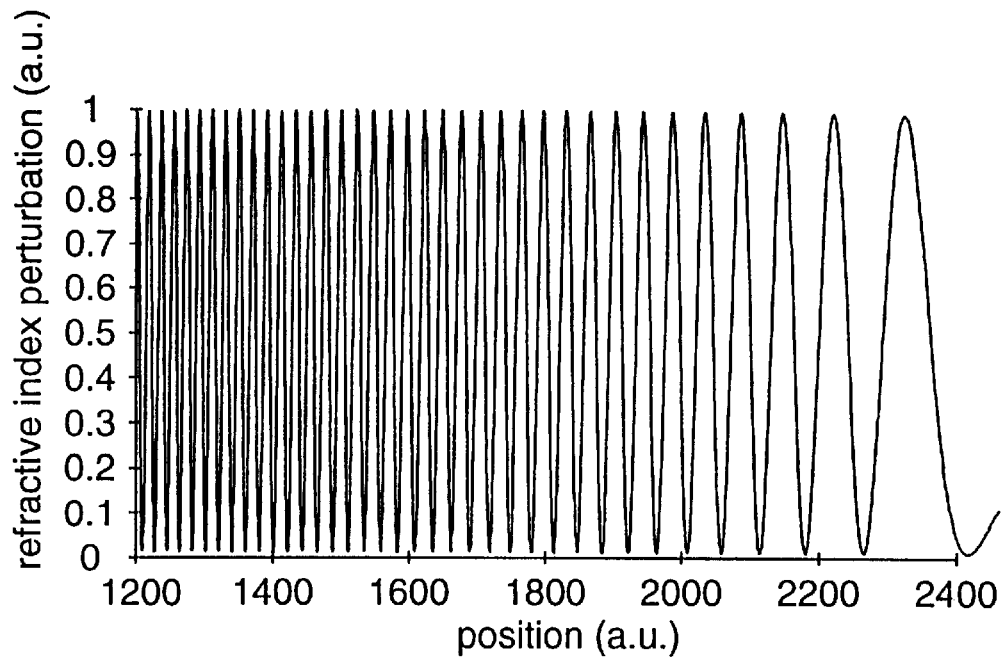
FIG. 5 is a plot of a chirped refractive index profile of a waveguide manufactured in accordance with the present invention.

By detuning the frequency of the light amplitude modulation or changing the velocity of the fiber, for example in a chirped (increasing or decreasing) pattern, a chirped FBG of any length may be manufactured. FIG. 5 illustrates an exemplary chirped refractive index profile of a fiber manufactured in accordance with the present invention. A small phase mask (say 1" o.d.) of an appropriate period could be used to make very long gratings that are chirped over a very wide wavelength range. In an embodiment of the present invention, the dispersion compensation product covers the full Erbium-doped fiber amplifier range, from 1528 nm to 1568 nm. A 40 nm chirp is written into a single FBG with a laser beam diameter less than ~10 $\mu$m, by keeping the argument in the sinc function in equation (6) less than $\pi$. A 4 nm chirped FBG may be written with a beam diameter less than ~100 $\mu$m. These diameters are mathematical upper limits. In practice, one would use beams with diameters less than half this size to write a usable fringe visibility into the grating.

As the frequency of the light modulation or the velocity of the fiber is changed, the tuning parameter in the sinc function of equation (6) will increase from zero and cause the amplitude of the cosine-function spatial-modulation to decrease. If these control parameters are changed too much, no net modulation will result. The amplitude decrease is proportional to the diameter of the laser beam, which can be focused to make wide wavelength chirps possible. The limits of the relationship $$\frac{f(t)}{v(t)} \approx \frac{1}{\Lambda},$$

are defined at the limit where a sufficient refractive index modulation is written into the waveguide to create an acceptable grating. Depending on the type and the precision of grating that is being written, this difference between the sides of the above equation could be, for example, as large as 10%.

A key distinction between this inventive method and other in-line grating fabrication techniques is that, in the present method, motion between the optical fiber and interferogram is velocity controlled, while the other techniques for manufacturing long-length gratings rely on precise positioning devices (indexing).

Deviations in the fiber grating pitch ($\delta\Lambda$) due to jitter in the equipment can be determined by modeling the stage velocity as $v = v_0 \pm \delta$ and the modulator frequency as $f = f_0 \pm \delta f$, where $\delta v$ and $\delta f$ are the respective jitter terms. The fiber grating pitch would be $$\Lambda \pm \delta\Lambda \approx \frac{v_0 \pm \delta v}{f_0 \pm \delta f} \approx \frac{v_0}{f_0}\left(1 \pm \frac{\delta v}{v_0} \pm \frac{\delta f}{f_0}\right) \quad (8)$$

resulting in deviations in the FBG resonance wavelength due to equipment jitter on the order of $$\frac{\delta\lambda}{\lambda_B} = \pm\frac{\delta v}{v_0} \pm \frac{\delta f}{f_0}. \quad (9)$$

The velocity of the motion stage and the frequency of the modulator would vary <0.01% to achieve 0.15 nm accuracy in the Erbium-doped fiber amplifier wavelength range. Scanning velocities are typically ~1 mm/s when manufacturing dispersion compensation FBGs, so a motion stage with <0.1 $\mu$m/s precision is needed. With this writing speed, a ~2 KHz modulation with <0.2 Hz flutter is needed to produce gratings in the Erbium-doped fiber amplifier band. Currently available opto-acoustic modulators are capable of <1 $\mu$Hz flutter, and commercially-available rotary stages controlled with a phase-lock-loop are capable of <0.001% velocity flutter on a rim-speed of 1 mm/s. Fibers with higher photosensitivity allow for an increased FBG writing velocity, which loosens requirements on the motion stage.

Figure 4:
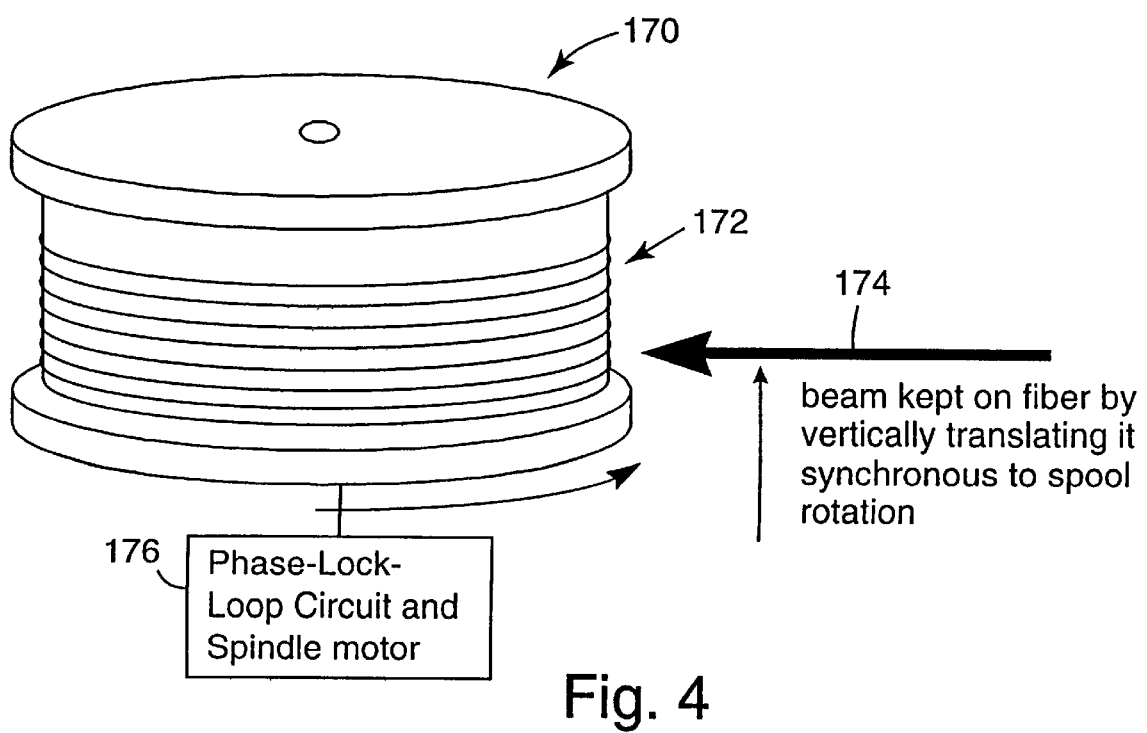
FIG. 4 is a simplified representation of an embodiment of the present invention where the fiber is drawn by a spool.

To manufacture a grating longer than the range of travel of precision motion stages, one may translate the fiber through the interferogram in a web-drive system. The fiber could be placed into V-grooves, or precision V-groove pulleys, similar to those used in the fiber holding assembly 160 illustrated in FIG. 2 to maintain precise alignment of the fiber with the interference pattern. Since the method of the present invention requires velocity control, as opposed to precise positioning, the fiber may be rolled onto spools 170, as illustrated in FIG. 4, which rotate to translate a continuous length of fiber 172 in front of an interferogram created by a phase mask from a modulated laser beam 174. The spool 170 is part of a spool to spool system. The rotational speed of these spools is achieved with a spindle motor controlled by simple phase-lock-loop circuitry 176 to provide precise rim velocities. As illustrated in FIG. 4, the beam 174 is kept on the fiber 172 by vertically translating the beam 174 synchronous to the rotation of the spool 170. The position of the writing beam 174 may be tracked, such as with a laser beam, to stay on the fiber 172 as the spool rotates.

In an alternative embodiment of this invention, the uncoated fiber may be permanently affixed to the spool, and the spool with the grating may be packaged, thereby reducing fiber handling.

Figure 6:
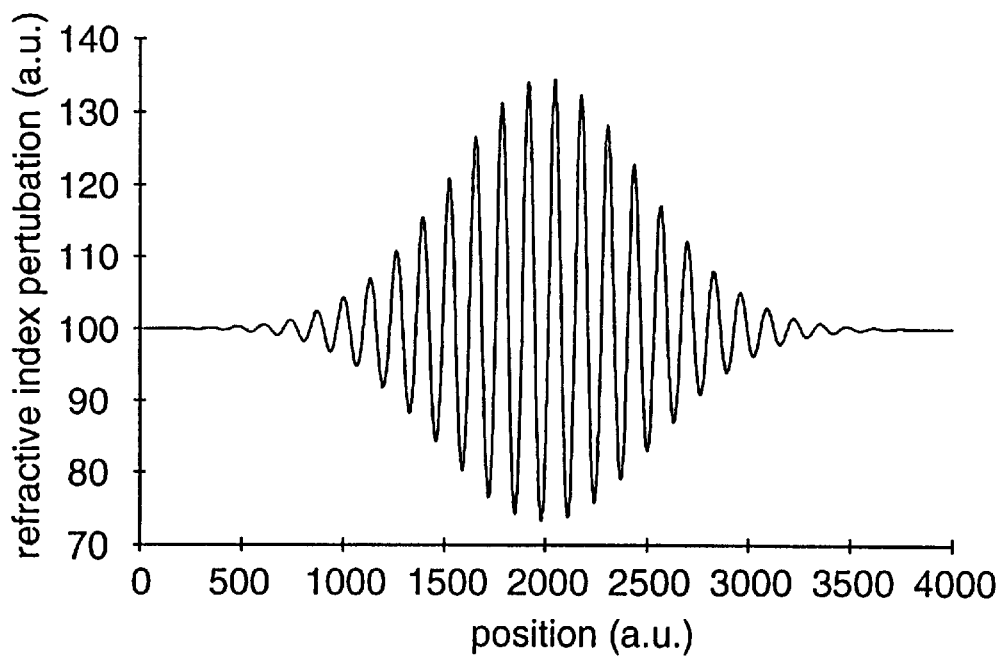
FIG. 6 is a plot of a pure apodization refractive index profile of a waveguide manufactured in accordance with the present invention.

The method of the present invention also may be used to produce apodized fiber Bragg gratings, having a refractive index profile as illustrated in FIG. 6. Pure apodized gratings may be manufactured with the method of the present invention by modulating the amplitude of the sinusoidal signal, via another function generator or suitable electronics, as the fiber is translated through the interferogram. To achieve pure-apodization, the sinusoidal-function amplitude is controlled before an offset is applied. Mathematically this scheme may be expressed as $$\Phi(x) \approx \frac{I_0(x)}{4} \cdot \frac{D}{v(x)} \cdot \left\{ A(x) - \frac{m(x)}{2} \cdot \cos\left[\frac{\omega(x)}{v(x)} \cdot x\right] \right\} \quad (10)$$

where the amplitude modulation, m, varies between zero and one if A(x)=1. As those skilled in the art may appreciate, the peak intensity illuminating the fiber, $I_0$, velocity of translation, v, and the offset of the oscillating index perturbation, A, may also be controlled to tailor the refractive index profile of a grating. If the peak intensity, velocity, and offset are held constant as a function of time, the average flux delivered to the fiber is constant, i.e.

$$\Phi(x) \approx \frac{I_0}{4} \cdot \frac{D}{v},$$

regardless of the level of amplitude modulation.

Chirped FBGs with pure apodization can be manufactured in a one-step writing process, without special phase masks, attenuation optics, or controlled laser beam attenuation. For example, a 4-nm-wide linearly-chirped FBG that is 160 cm long can be manufactured by translating a fiber at a velocity of 1 mm/s across a phase mask of period 1.0739 μm as the frequency of the laser beam modulation is linearly varied from 1859.98 to 1864.76 Hz (a 4.784033 Hz span). Since the grating will take 1600 s to write, a raised-sinusoid apodization may be achieved by amplitude modulating the function generator output by a 0.312 milliHertz sinusoid. Other amplitude modulation profiles may be used to tailor the FBG for specific applications.

Figure 7:
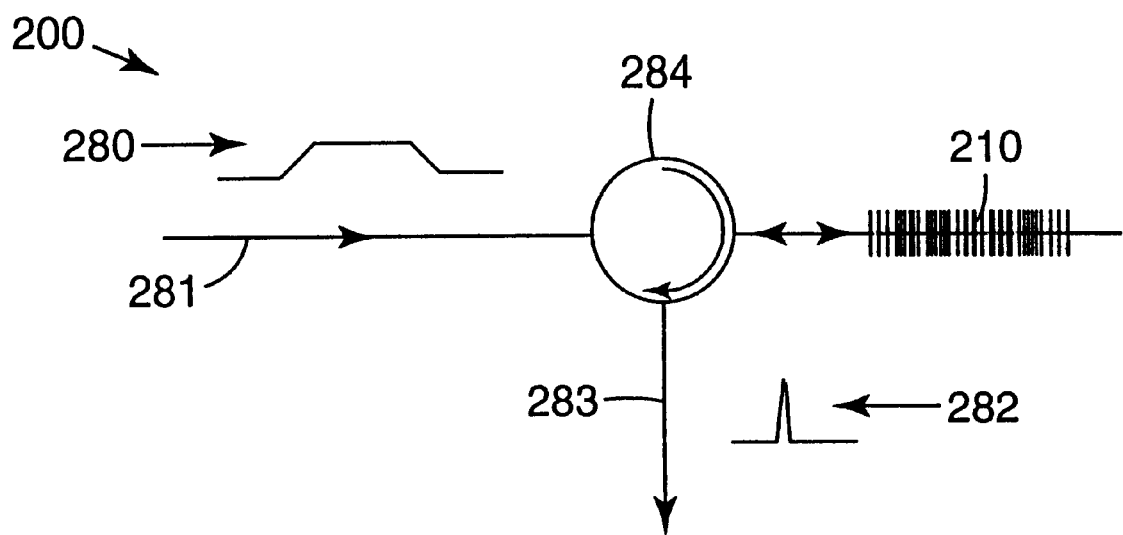
FIG. 7 is a simplified schematic diagram of a dispersion compensator in accordance with the present invention.

Long-length fiber Bragg gratings manufactured in accordance with the present invention may be used in a variety of applications. FIG. 7 illustrates the use of long-length fiber Bragg grating 210 in a dispersion compensator 200. The signal 280 suffers from chromatic dispersation after traveling down a significant length of fiber (usually in the order of hundreds of kilometers). The signal is coupled to a circulator 284, which directs the signal to the long-length chirped fiber Bragg grating 210. The spectrum of wavelengths of the signal are each reflected after traveling a different distance through the fiber Bragg grating. The additional travel distance recompresses the signal, feeding a dispersion compensated signal 282 to the circulator 284.

Figure 8:
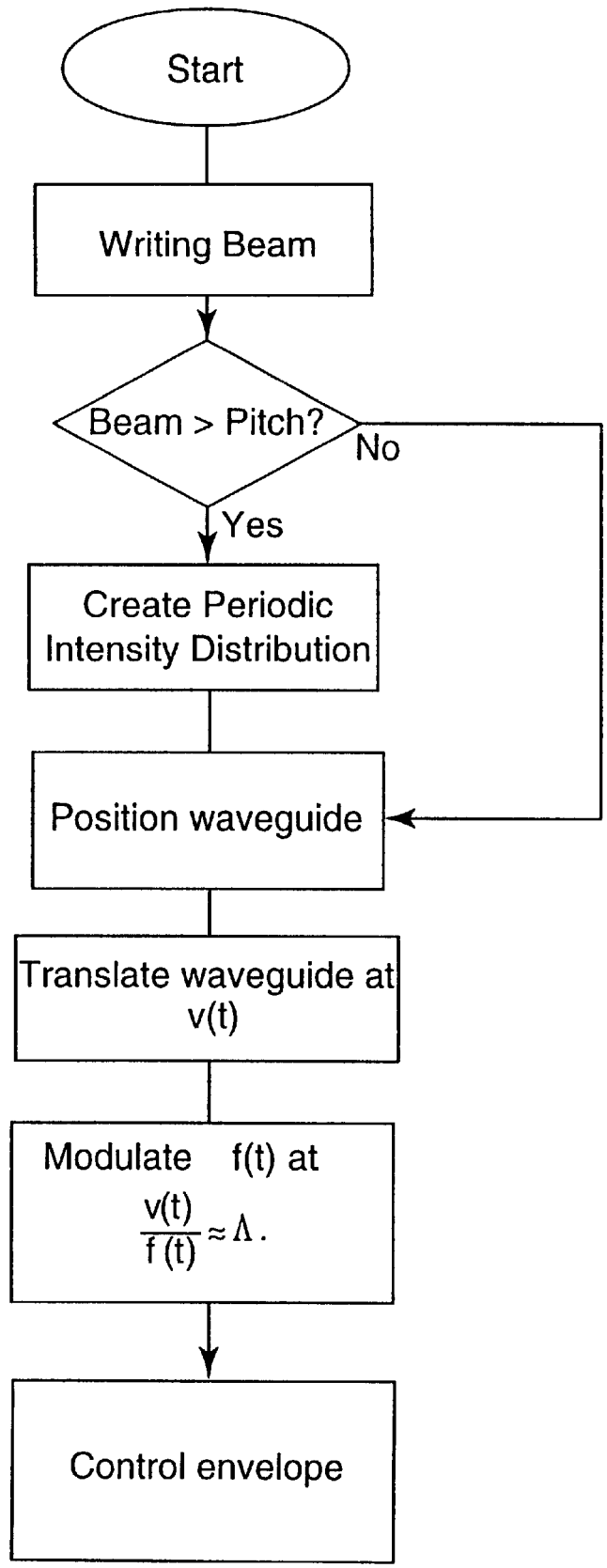
FIG. 8 is a flow diagram of an embodiment of the method of the present invention.

FIG. 8 is a flow diagram of a method for manufacturing in-line optical waveguide refractive index gratings of virtually any length in accordance with the present invention. A writing beam of actinic radiation is provided. If the beam is smaller that the desired grating pitch, then no interference pattern generator is necessary, otherwise a periodic intensity distribution of period Λ is created from the writing beam. A photosensitive waveguide is provided and placed across the path of the writing beam. Then, the waveguide is translated relative to the writing beam at a velocity v(t). The intensity of the writing beam as a function of time is modulated at a frequency f(t), wherein $$\frac{v(t)}{f(t)} \approx \Lambda.$$

If apodized gratings are desired, the intensity of the writing beam may be varied further to control the envelope of the refractive index perturbation.

The method of the present invention offers the ability to write in-line optical waveguide refractive index gratings of virtually any length with complicated refractive index profiles. The availability of gratings longer than one meter allows for the first time the effective use of gratings in a variety of applications. As those skilled in the art may appreciate, the inventive method disclosed in the present document can be used to modify the refractive index not only of optical fiber, but also of planar waveguides.

The methods and embodiments described and illustrated herein are illustrative only, and are not to be considered as limitations upon the scope of the present invention. Those skilled in the art will recognize that other variations and modification may be made in accordance with the spirit and scope of the present invention.

What is claimed is:

1. A method for manufacturing an in-line optical waveguide refractive index grating having a desired grating pitch Λ, the method comprising the steps of:
   providing a photosensitive waveguide;
   providing a writing beam of actinic radiation;
   translating the waveguide relative to the writing beam at a velocity v(t);
   modulating the intensity of the writing beam as a function of time at a frequency f(t), wherein $$\frac{v(t)}{f(t)} \approx \Lambda.$$

2. The method of claim 1, further comprising the step of creating an intensity distribution of period Λ from the writing beam and translating the waveguide relative to the intensity distribution.

3. The method of claim 2, wherein the intensity distribution is a periodic intensity distribution.

4. The method of claim 2, the step of creating the intensity distribution comprising placing an interference pattern generator between the writing beam and the waveguide.

5. The method of claim 4, wherein the interference pattern generator is a phase mask having a period of 2Λ.

6. The method of claim 1, the step of providing a writing beam comprising providing a writing beam having a peak intensity illuminating the fiber $I_0$ and a width D, wherein the fluence $\Phi(x)$ delivered to the waveguide is determined by the equation $$\Phi(x) \approx \frac{I_0(x)}{4} \cdot \frac{D}{v(x)} \cdot \left\{ A(x) - \frac{m(x)}{2} \cdot \cos\left[\frac{\omega(x)}{v(x)} \cdot x\right] \right\},$$

wherein A is an offset and m is fringe visibility.

7. The method of claim 6, further comprising the step of varying further the intensity of the writing beam to control the envelope of the refractive index perturbation written along the waveguide length.

8. The method of claim 7, wherein the step of varying further the intensity of the writing beam includes the step of varying $I_0$ to control the envelope of the refractive index profile along the waveguide length.

9. The method of claim 7, the step of varying further the intensity of the writing beam includes the step of varying the offset A to control the envelope of the refractive index profile along the waveguide length.

10. The method of claim 7, wherein the step of varying further the intensity of the writing beam includes the step of varying the visibility m to control the envelope of the refractive index profile along the waveguide length.

11. The method of claim 7, wherein the step of varying further the intensity of the writing beam includes the step of varying the velocity v to control the envelope of the refractive index profile along the waveguide length.

12. The method of claim 1, wherein v(t) is a constant.

13. The method of claim 1, wherein ƒ(t) is a constant.

14. The method of claim 1, the step of modulating the intensity of the writing beam as a function of time at a frequency ƒ(t) further comprising the step of varying ƒ(t) as the grating is being fabricated.

15. The method of claim 13, wherein ƒ(t) is varied in a chirped pattern.

16. The method of claim 1, the step of translating the waveguide further comprising the step of varying v(t) as the grating is being fabricated.

17. The method of claim 1, the step of translating the waveguide comprising the steps of coupling the waveguide to a spool and rotating the spool to draw the waveguide at v(t).

18. The method of claim 1, wherein the step of translating the waveguide comprises controlling the velocity of the waveguide using a phase-lock-loop circuit.

19. The method of claim 1, wherein the beam comprises an ultraviolet radiation laser beam.

20. A fiber Bragg grating manufactured in accordance with the method of claim 1.

21. A method for manufacturing an in-line optical waveguide refractive index grating, the method comprising the steps of:

providing a photosensitive waveguide;

providing a writing beam of actinic radiation;

creating a periodic intensity distribution of period Λ from the writing beam;

translating the waveguide relative to the intensity distribution at a velocity v(t);

modulating the intensity of the writing beam as a function of time at a frequency f(t), wherein $$\frac{v(t)}{f(t)} \approx \Lambda,$$

wherein v(t) and f(t) are variables.

22. The method of claim 21 where one of the variables is held generally constant.

23. The method of claim 21, where at least one of the variables is detuned as a function of time to write a complex refractive index grating.

24. The method of claim 21, wherein ƒ(t) is varied in a chirped pattern.

25. The method of claim 21, the step of translating the waveguide comprising the steps of coupling the waveguide to a spool and rotating the spool to draw the waveguide at v(t).

26. A fiber Bragg grating manufactured in accordance with the method of claim 21.

27. The fiber Bragg grating of claim 26, wherein the fiber Bragg grating measures at least one meter in length.

28. A dispersion compensator including a fiber Bragg grating manufactured in accordance with the method of claim 21.

29. The method of claim 21, further comprising the step of varying the intensity of the writing beam to control the envelope of the refractive index perturbation written along the waveguide length as $$\Phi(x) \approx \frac{I_0(x)}{4} \cdot \frac{D}{v(x)} \cdot \left\{ A(x) - \frac{m(x)}{2} \cdot \cos\left[\frac{\omega(x)}{v(x)} \cdot x\right] \right\},$$

wherein A is an offset and m is fringe visibility.

30. A fiber Bragg grating manufactured in accordance with the method of claim 29.

31. The fiber Bragg grating of claim 30, wherein the fiber Bragg grating is apodized.

32. A dispersion compensator including a fiber Bragg grating manufactured in accordance with the method of claim 30.

33. A method for writing apodized Bragg gratings into an optical fiber, the method comprising the steps of:

providing a photosensitive optical fiber;

providing a writing beam of actinic radiation;

creating a periodic intensity distribution of period Λ from the writing beam;

translating the optical fiber relative to the intensity distribution at a velocity v(t);

modulating the intensity of the writing beam as a function of time at a frequency f(t), wherein $$\frac{v(t)}{f(t)} \approx \Lambda;$$

and varying further the intensity of the writing beam to control the envelope of the refractive index profile.

34. The method of claim 33, the step of creating the periodic intensity pattern with an interferogram comprising the steps of:

providing a phase mask having a period 2Λ; and placing the phase mask between the writing beam and the optical fiber.

35. The method of claim 33, the step of modulating the intensity of the writing beam as a function of time at a frequency f(t) further comprising the step of varying f(t).

36. The method of claim 33, further comprising the step of varying further the intensity of the writing beam to control the envelope of the refractive index profile written along the waveguide length as $$\Phi(x) \approx \frac{I_0(x)}{4} \cdot \frac{D}{v(x)} \cdot \left\{ A(x) - \frac{m(x)}{2} \cdot \cos\left[\frac{\omega(x)}{v(x)} \cdot x\right] \right\}.$$

37. A fiber Bragg grating manufactured in accordance with the method of claim 33.

38. The fiber Bragg grating of claim 37, wherein the fiber Bragg grating measures at least one meter in length.

39. A dispersion compensator including a fiber Bragg grating manufactured in accordance with the method of claim 33.

40. An in-line optical waveguide refractive index writing assembly, the assembly comprising:

a source of a writing beam of actinic radiation;

a modulator coupled to vary the intensity of the writing beam as a function of time at a frequency ƒ(t);

a generator of a periodic intensity distribution of period Λ from the writing beam;

a translation mechanism arranged to translate a waveguide through the periodic intensity distribution at a velocity v(t), wherein;

$$\frac{v(t)}{f(t)} \approx \Lambda.$$

41. The assembly of claim 40, wherein the periodic intensity distribution generator is a phase mask having a period 2Λ.

42. The assembly of claim 40, where a means is provided to vary further the intensity of the writing beam to control the envelope of the refractive index written along the waveguide length.

43. The assembly of claim 40, where the modulator is an opto-acoustic modulator.

44. The assembly of claim 40, where the translation mechanism is arranged to translate more than one waveguide simultaneously through the periodic intensity distribution.

* * * * *

UNITED STATES PATENT AND TRADEMARK OFFICE
CERTIFICATE OF CORRECTION

PATENT NO. : 5,912,999
DATED : June 15, 1999
INVENTOR(S) : James F. Brennan, III, Dwayne LaBrake, Gerard A. Beauchesne and Ronald P. Pepin It is certified that error appears in the above-indentified patent and that said Letters Patent is hereby corrected as shown below:

On the Title Page

[54] "METHOD FOR FABRICATION OF IN-LINE OPTICAL
WAVEGUIDE INDEX GRATING OF ANY LENGTH"

should read

[54] -- METHOD FOR FABRICATION OF IN-LINE OPTICAL
WAVEGUIDE REFRACTIVE INDEX GRATINGS OF
ANY LENGTH --.

[73] "Minnesota Mining and Manufacturing Company"

should read

[73] --3M Innovative Properties Company

Signed and Sealed this

Twenty-second Day of May, 2001

Attest:

NICHOLAS P. GODICI

Attesting Officer

Acting Director of the United States Patent and Trademark Office